Sept. 5, 1950   GEORGES-GABRIEL MOZZANINI ET AL   2,521,182
LOAD DISTRIBUTING ARRANGEMENT BETWEEN
DIRECT CURRENT MACHINES Filed April 4, 1947                              2 Sheets-Sheet 1

INVENTORS
Georges Gabriel Mozzanini
Maurice Liebertre
By George H. Cooley
ATTORNEY

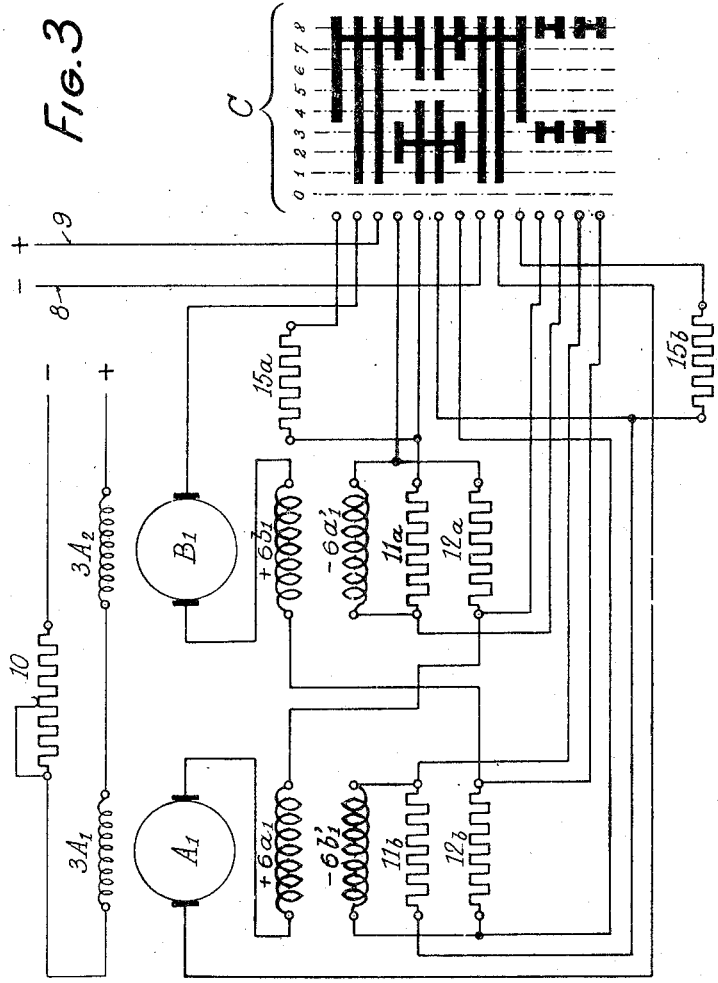

Patented Sept. 5, 1950

2,521,182

UNITED STATES PATENT OFFICE 2,521,182

LOAD DISTRIBUTING ARRANGEMENT BETWEEN DIRECT-CURRENT MACHINES

Georges-Gabriel Mozzanini, La Garenne Colombes, and Maurice Lebertre, Paris, France Application April 4, 1947, Serial No. 739,480
In France April 6, 1946

13 Claims. (Cl. 318—92)

Our invention has for its object improvements in control means providing a suitable distribution of loads between direct current machines. In our former construction, each D. C. machine is provided in addition to its normal energizing winding with two windings in opposition one of which is subjected to the action of said machine while the second is subdivided into as many parts minus one as the system includes machines to be adjusted, each of said parts being subjected to the action of the other associated machines.

Our present invention has for its object improvements to such an arrangement as applied to the control through mechanically coupled motors that are adapted to be coupled electrically in various manners.

Our invention has for its chief object an easy means of producing a strong torque when starting and then the passage from series coupling to parallel coupling together with, in the case of a group of four motors, a passage through the intermediary series-parallel-coupling, each coupling being associated with the operation of the energizing rheostat of the motors of the group.

Our invention aims also at producing in an auxiliary manner a continuous variation of the speed of the group of motors.

According to the present invention as applicable to the group of motors, the additive and subtractive windings provided in our prior form of execution are connected in a manner such that they may all act as additive windings during the starting period in order to produce a strong torque.

In its broad concept, the invention relates to a means for controlling the speed of a direct current motor utilizing in addition to the field excitation winding a compensating series field winding which is arranged to be connected so as to be additive to the field flux produced by the field excitation winding upon starting of the motor and thereafter is adapted to be reconnected in the series circuit so as to be subtractive thereby to weaken the field flux and to increase the speed of the motor. In one aspect this compensating series field winding initially may be connected to be additive and then may be short-circuited so as to reduce the additive flux thereby to increase the speed of the motor. In another aspect complementary to the preceding aspect the resistance of the circuit of the series field winding and the armature is reduced concomitantly with the reduction of the flux. In the third aspect where the compensating series field winding is connected to be subtractive still further to reduce the flux and increase the speed, the resistance of the armature and series field circuit is still further reduced. Such reductions in the resistance increasing the armature current give further effect to the acceleration of the speed of the motor.

In a particular form of execution, we will place the subtractive series windings forming the compensation winding for each motor between starting resistances inserted in series and when the starting period is at an end we connect directly on one hand the entrance to the said resistance to the exit of said winding and on the other hand the exit of the other resistance to the entrance to said winding.

In the case of motors having a shunt or independent field excitation characteristic, which are to be coupled in succession in series, in parallel or even in series-parallel connection when there are at least four of such motors, the additive windings are connected in a manner such that they may be switched out of circuit when the motors are coupled in series.

Other features and advantages of our invention will appear in the following description and accompanying drawings, given out, however, solely by way of example.

Lastly, Fig. 3 is a wiring diagram including two motors with a compound characteristic, the control of which is provided with a hand actuated controller or combinator.

Figure 1:
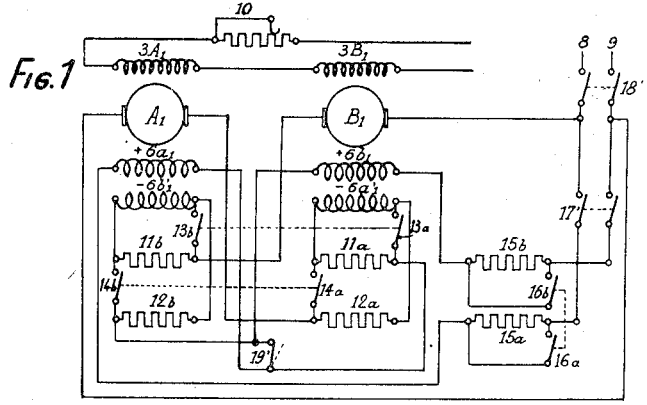
Fig. 1 is a wiring diagram including two motors with an independent excitation connected in accordance with our invention.

Referring to Fig. 1, A1 and B1 are the armatures of two motors with an independent field excitation, the field coils of which are shown respectively at 3A1 and 3B1; the compensating windings are shown at 6a1 and 6b1 in the case of the additive windings and at 6b'1 and 6a'1 for the subtractive windings. To either side of these latter windings are located starting resistances 11a, 11b, 12a, 12b, it is apparent that each of these two subtractive windings is connected in series with two starting resistances.

A double pole switch 13a, 13b allows connecting the entrance to the starting resistances 11a, 11b respectively with the exits of the adjacent windings 6a'1 and 6b'1. Another double pole switch 14a, 14b provides for the connection between the entrances to said windings and the exits of the other resistances 12a, 12b, which comes to say that the double pole switch 13a, 13b is adapted to connect the windings 6a'1, 6b'1 across the two starting resistances 11a and 11b respectively. Similarly the double pole switch 14a, 14b allows connecting the same windings in parallel with the two starting resistances 12a and 12b respectively.

Broadly considering first the motor A1, this motor may be started by establishing the connection from the supply line 8 consecutively in series through the resistance 11b, the compensating series field winding 6b'1 arranged to be additive, the resistance 12b and thence (through the corresponding compensating winding and resistances of the motor B1 in the arrangement of Fig. 1) through the armature of the motor A1 to the supply line 9. This arrangement provides not only for limitation of the rush of the armature current by the interposition of the resistances 11b and 12b but secures a high starting torque by virtue of the additive flux produced by the compensating series field winding 6b'1.

The first step of reconnection for accelerating the speed of the motor is to short-circuit the compensating series field winding 6b'1 and one of the resistances, in the particular example described the resistance 11b by closing the switch 13b. Such short-circuiting decreases the resistance in the armature circuit and at the same time reduces substantially to zero the field flux of the compensating winding 6b'1. The combined effect of decreasing the total field flux and increasing the armature current gives a strong impetus to increase of speed of the motor. Thereafter, upon closing the switch 14b the compensating series field winding 6b'1 becomes connected in parallel with both the resistances in 11b and 12b, this winding and these resistances as a group remaining connected in series with the armature A1 of the motor with which the compensating winding and its cooperating resistances are associated. It is apparent upon a consideration of the wiring diagram of Fig. 1 that by this reconnection to the parallel arrangement the compensating series field winding 6b'1 becomes subtractive. The field flux thereby is further weakened and at the same time the resistance in series with the armature is still further reduced. This concomitant action gives a further strong impetus to the increase of the speed of the motor. Further control of the speed of the motor may be accomplished by regulating the rheostat 10 to weaken the field 3A1.

The arrangement in relation to the motor B1 is similar and as shown in Fig. 1 initially the armatures A1 and B1 are connected in series, the changes of the connections of the compensating field windings being accomplished simultaneously by the interconnection of the switches 13a and 13b and of the switches 14a and 14b. When upon opening the switch 19' and closing the switch 17' the armatures A1 and B1 are connected in parallel the sequence of operations of the switches 13a, 13b, 14a and 14b again may be developed to produce the steps of impetus to increase the speed of the motors thus connected in parallel. It is to be noted also that in the arrangement of Fig. 1 the primary additive series field windings of the two motors are not connected in circuit until the parallel connection is established. Moreover, it should be noted that the sequence of operation of the switches 17' and 19' is such that the switch 17' is first closed and then the switch 19' is opened and a "bridge" connection thus is established in passing from the series connection to the parallel connection.

Two other resistances for transient action 15a and 15b are inserted in series respectively with the additive windings 6a1 and 6b1. They may be respectively short circuited by a double pole switch 16a, 16b and another double pole switch 17' is adapted to connect them to the mains 8 and 9 through a general double pole switch 18'. Switch 17' when closed provides for the parallel connection of the two motors A1 and B1 whereas a switch 19' when closed with switch 17' open ensures the series connection between these motors. Lastly a field rheostat 10 allows adjusting the energising current of the motor field windings 3A1 and 3B1.

The operation of the arrangement just described is as follows:

We always start the system when the motors are connected in series i. e. the switch 17' is open while the switch 19' is closed. The two double pole switches 13a, 13b and 14a and 14b are also open. The rheostat 10 is set in its short circuiting position so that the two motors are under full field conditions; in such a case the motors are connected in series with reference to one another to their subtractive windings 6a'1 and 6b'1 and to their starting resistances 11a, 11b, 12a, 12b. The additive windings are not in circuit at the moment considered since switch 17' is open.

It should also be noticed that the subtractive windings are connected in such a manner that during this short starting period they may act as additive windings. It is apparent from the following disclosure how and when they become subtractive i. e. operate normally as in prior arrangements. The object of their operation as additive windings is to provide a strong starting torque.

The next step in the starting consists in closing the switches 13a, 13b which has for its action to shunt the windings 6a'1 and 6b'1 by the resistance 11a and 11b respectively through said contact switches 13a and 13b. This being done, the switches 14a and 14b are then closed so as to connect the second resistances 12a and 12b in parallel respectively with the former resistances and with the windings 6a'1 and 6b'1. As apparent from the drawing, the entrance to and exit of the windings 6a'1 and 6b'1 are reversed as the latter are now respectively in parallel with resistances the ohmic value of which is clearly higher than the value of their own resistance. Consequently the compensating windings considered as subtractive in the disclosure do now actually act as such.

In order to increase the speed of the motors the value of the active resistance of the rheostat 10 is increased. If the speed of the motor under full field conditions were N, the series coupling is maintained until the speed of the motor reaches 2N.

The series coupling being a stable one it is of interest to compensate for the drop in voltage occurring through the operation of this coupling, which drop in voltage is all the more objectionable when the motors are fed only with a fraction of the normal feed voltage, say one half, if two motors are coupled in series, or one quarter if there are four of them.

To this purpose, the subtractive windings remain alone in circuit in the series coupling and the reduction in flux obtained thereby acts so as to neutralize the action of the drop in voltage on the speed. This arrangement is possible because it is applicable only to a part of the possible field reduction and this is done very near full field conditions. This ensures thus stability of operation of the motors while furthering the stability of their speeds while the load might vary.

When it is desired to make the speed increase still further the parallel coupling is resorted to by simultaneously returning the rheostat 10 to its short circuiting position and reinserting the starting resistances 11a, 11b, 12a, 12b, in circuit so that the windings 6a'1 and 6b'1 may again be additive. This passage into parallel coupling is obtained in two steps: the double pole switch 17' is first closed and the motors are operated at the same time under series and parallel connection in a bridge connection through the transient resistances 15a, 15b according to a known connecting system; but it should be noted in the present case the particular feature that the additive windings 6a'1 and 6b'1 are now inserted in the circuit. Then the switch 19' is opened and parallel coupling is obtained. Lastly the closing of the double pole switch 16a—16b short-circuits the transient resistances 15a and 15b. This being done the resistances 11a, 11b, 12a, 12b are again eliminated by being connected across the corresponding windings 6b'1 and 6a'1 which have therefore become again subtractive. In order to increase the speed in the parallel coupling, it is sufficient to reduce the field of the motor by increasing the resistance of the rheostat 10. With this parallel coupling it is possible to make the speed increase gradually from 2N to 8N.

Thus we obtain a variation in speed of 1:2 in the series coupling and of 2:8 in the parallel coupling.

In order to reduce the speed the reverse operations should be executed in the reverse sequence.

In the case where it is desired to make the arrangement work directly at a speed which corresponds to parallel coupling, the starting nevertheless is again ensured as in the general case with a series coupling, but it would be of advantage to short-circuit the starting resistances 11a, 11b, 12a, 12b only after the coupling has been changed so as to keep the resistances in the circuit and to make the operation smoother.

Figure 2:
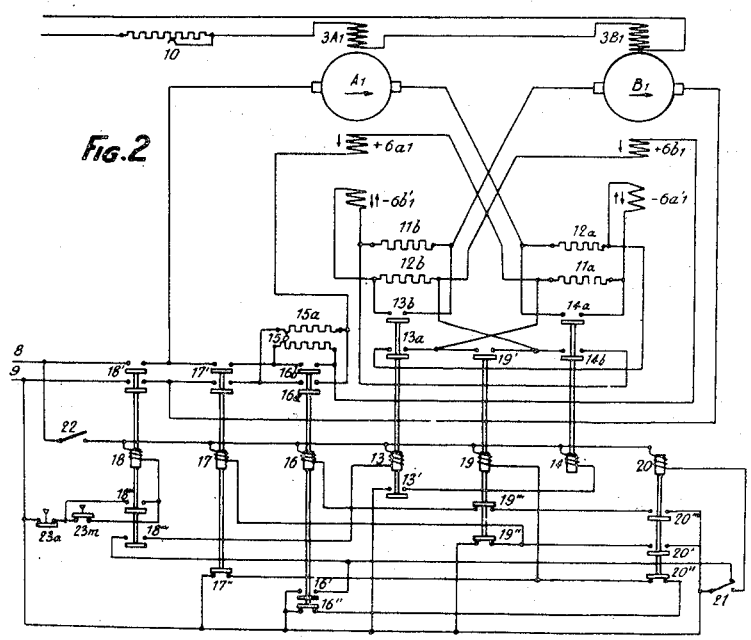
Fig. 2 is a diagram including the automatic control circuit for the same.

The different switches described hereinabove may be controlled by hand. However it seems preferable to provide automatic control as illustrated in Fig. 2 by way of example. Said figure shows a wiring diagram of the control circuit allowing the operation of said switches in the desired sequence. In said figure, we have shown diagrammatically the contactor coils 13, 14, 16, 17, 18, 19 controlling the contacts or switches 13a, 13b, 14a, 14b, 16a, 16b, 17', 18', 19' respectively of the diagram shown in Fig. 1 together with the supplementary relay coil 20, controlling contacts 20', 20'', 20''', a manual double throw switch 21 and two push buttons for starting and stopping shown respectively at 23m and 23a. The coil 18 controls in addition to the contacts 18', a contact 18'' adapted to shunt the starting push button contacts 23m and a contact 18''' inserted in series with the contactor coil 13. The latter in addition to its contacts 13a and 13b controls a contact piece 13' in series with the coil 14. The coil 20 controls a contact 20' in series with the coil 17, a contact piece 20'' in series with the coil 19 and a contact 20''' in series with the coil 16. The latter controls in addition to the contacts 16a and 16b a contact 16' in series with the coil 13 and a further contact 16'' in series with the contact 20'' and with the coil 19. The coil 17 controls in addition to the contacts 17' a contact 17'' adapted to shunt the system of contacts 20'' and 16''. Lastly the coil 19 controls in addition to the contact 19' a contact 19'' adapted to shunt the contact 20' and a contact 19''' inserted in series with the coil 16 and the contact 20'''. All this control circuit may be fed for instance through a switch 22, from the same mains 8 and 9 that feed the motor system.

The operation of this control circuit of Fig. 2 is as follows: Let it be assumed that switch 22 is open, there is no current in the device which therefore is at rest and all the contacts occupy the position as shown in the drawing.

To set the device ready for operation it is sufficient to close switch 22. Contactor coil 19 becomes energized since contacts 20'' and 16'' are closed due to coils 20 and 16 being de-energized. Contact 19'' then opens and coil 17 is de-energized while contact 19''' opens, contact 20''' already being open.

Contactor coil 19 is consequently the only one energized. To start the group, the push button 23m is depressed so as to feed the contactor coil 18 which effects closing of contacts 18', 18'' and 18'''. When the push button 23m is released, the coil of the contactor 18 continues being fed through its holding contact 18'' and the normally closed switch 23a. The energization of coil 18 brings about the closing of the contact 18''' which provides for the feeding of the contactor coil 13 through the double throw switch 21 occupying the upper position for series coupling as illustrated in the drawing. The energization of the coil 13 provides for the closing of the contacts 13a and 13b and consequently the shunting of the system including the resistance 11a and subtractive winding 6a'1 on one hand and the shunting of the similar system including the resistance 11b, and the subtractive winding 6b'1 on the other hand. The energization of the coil 13 produces also the closing of the contact 13' which ensures the energization of the coil 14; this provides for a connection of the resistances 12a and 12b respectively in parallel with the winding 6a'1 and 6b'1 due to the closing of contacts 14a and 14b. It is apparent that this connection effects a reversal of current through the windings 6a'1 and 6b'1. The series coupling is now obtained and it is possible to increase the speed of the motors preferably from 1 to 2, by adjusting the field rheostat 10.

It should be noticed that for series motor coupling the contactor coil 9 is energized because switch 21 being in its upper position, coil 20 is not energized. Contact 20'' is therefore closed, contact 20''' open, coil 16 de-energized and contact 16'' closed. Coil 19 is energized through closed contacts 20'' and 16'' and consequently the auxiliary contacts 19'' and 19''' are open. Contactor coil 17 is de-energized and contacts 17' open. When it is desired to pass from series coupling to parallel coupling, it is necessary to return the rheostat 10 to full field conditions and to simultaneously depress the double throw switch 21. This provides for the deenergization of the contactor coil 13, which causes contact 13' to open and coil 14 to be de-energized. This results in a series connection of the starting resistances 11a—12a on one hand and 11b—12b on the other hand respectively with the windings 6a'1 and 6b'1. The result is a reversal of the current in the coils 6a'1 and 6b'1 which are now again additive. At the same time the coil of the contactor 20 is energised, whereby the contact 20' is closed while the contact 20'' is opened and the contact 20''' closed. The closing of the contact 20' produces the energization of coil 17 and therefore the closing of the contacts 17' which ensures the bridge connection. The contact 17" opens and consequently the contactor coil 19 is no longer fed and the contact at 19' opens thus interrupting the series connection of the two motors. The contact 19''' closes which allows the feeding of the coil 16 causing the transient resistances 15a and 15b to be short-circuited by contacts 16a and 16b respectively.

The windings 6a1 and 6b1 are now in circuit. The energization of the coil 16 also closes the contacts 16' which results in the energization of the contactor coil 13 providing through the contacts 13a and 13b for the paralleling of the resistances 11a and 11b with the windings 6a'1 and 6b'1.

Due to the closing of the contact 13' the coil 14 is now energized, contacts 14a and 14b close and the resistances 12a and 12b are connected across the windings 6a'1 and 6b'1 respectively.

The parallel coupling is thus ensured and the stability of operation of the two motors is provided through the compensating coils 6a'1 and 6b'1, the current through which is again reversed and produces a subtractive flux compensating exactly the flux of the additive windings 6a1 and 6b1 when equilibrium is obtained.

A 1:4 variation in speed may now be obtained through operation of the field rheostat 10. The total variation in speed may thus reach a ratio of 1:8, the series coupling providing a variation of 1:2 and the parallel coupling a variation of 2:8.

Conversely when it is desired to reduce the speed, the field rheostat 10 is first returned to its position of minimum resistance and the series coupling is then resumed.

The series coupling is obtained by lifting the double throw switch 21 to the upper position in Fig. 2, the slider of the rheostat 10 being positioned at the point corresponding to the same motor speed for series coupling.

After lifting of the switch 21, the coil of the contactor 13 becomes energised through closed contact 18''' and the contacts 13a and 13b close. Contact 13' also closes thus energizing coil 14 and closing contacts 14a and 14b. The relay coil 20 is simultaneously deenergized causing opening of the contact 20'' and the closing of the contact 20'''. The relay coil 16 is switched out of the circuit so as to allow the re-insertion of the transient resistances 15a and 15b by the opening of contacts 16a and 16b. The contact switch 16'' closes and energizes the coil 19 which ensures through the agency of its principal contact 19' the passage into the intermediary bridge connection already referred to and also the switching off of coil 17, through the opening of contact 19''. The contacts 17' open and break the bridge connection and de-energise the additive coils 6a1 and 6b1. The series coupling is now completed and it is again possible to reduce the speed by adjustment of the field rheostat 10.

At every moment it is possible to operate the stop push button 23a for cutting off the general supply to the motor through the double pole contactor switch 18' the coil 18 of which is de-energized by the opening of switch 23a and this leads moreover to the opening of the contact 18''' and consequently to a de-energisation of the contactor 13 which opens the contact 13' and consequently de-energises the contactor 14. All the contacts thus resume their original positions.

It is preferable to start with a series motor coupling even if it is desired to make use of a final speed corresponding to parallel coupling and to this end the double throw switch 21 is set in its series coupling position before depressing the starting push button 23m. However, if it is desired to reach very rapidly a speed corresponding to a parallel coupling it is possible to depress the push button 23m and to leave the switch 21 in its parallel coupling position. In this case, the elimination of the starting resistances 11a, 11b, 12a, 12b and consequently the reversal of the direction of the current in the windings 6a'1 and 6b'1 is obtained only after energisation of the contactor coil 16, which allows through auxiliary contact 16' the energization of the contactor 13 and then the contactor 14 the contacts 13a, 13b, 14a, 14b of which short circuit the starting resistances.

In the preceding example the motors have shunt characteristics and consequently a substantially constant speed whatever their load may be and consequently this type of control is thus practically suitable to the control of machine-tools.

On the other hand in the case of hoisting machines or traction motors, for instance, it is necessary to obtain high starting torques and the constancy in speed is less important. This is the reason why for such application we prefer using compound or series motors the speed of which depends on the torque required.

Referring now to Fig. 3 it is apparent that A1 and B1 form the armatures of two motors with a separate excitation the field coils of which are shown respectively as 3A1 and 2A2. The additive windings are indicated at 6a1 and 6b1 and the subtractive compensating windings are shown at 6a'1 and 6b'1. The additive windings are coupled in such a manner that they may always be predominant with reference to the subtractive windings whereby the motor may retain a compound characteristic. To either side of the subtractive windings 6b'1 and 6a'1 are connected the starting resistances 11a, 11b, 12a, and 12b. The resistances 15a and 15b form transient resistances having a common terminal respectively with the starting resistances 11a and 11b. A controller C allows obtaining as disclosed hereinafter all the sequence required for starting and for passing from series to parallel coupling. This controller is constituted in conformity with the diagram (Fig. 3) and its different positions are indicated diagrammatically by position marks numbered from zero to 8. A rheostat 10 allows adjusting the energizing current in the field coils 3A1 and 3B1.

The operation of the last arrangement which has just been described is as follows:

The field windings 3A1 and 3A2 are fed from an independent source and the value of the excitation current is adjusted by the rheostat 10. The general supply to the armatures of the two motors is ensured from a main line 9 through the agency of the controller C. When the controller is in its zero position the motor is at rest. The controller allows coupling the two armatures in series or in parallel; for series coupling the positions 1, 2 and 3 are used and for parallel coupling the positions 5, 6, 7 and 8. The position 4 corresponds to a transient position which we may term bridge connection allowing the passage from parallel coupling to series coupling and reversely without breaking the circuit. For starting the motors, we first short-circuit the rheostat 10 and the controller is then brought to the position 1.

*Position 1.*—The two armatures are connected in series with the four windings 6a1, 6b1, and 6a'1, 6b'1 and with the four starting resistances 11a, 11b, 12a and 12b; this forms the first starting step. The two windings 6a1 and 6b1 form additive windings for all the positions of the controller but, in contradistinction, the windings 6a'1 and 6b'1 are arranged so as to be additive for this first position of the controller in order to provide a large torque when starting.

*Position 2.*—The windings 6b'1 and 6a'1 are connected in parallel respectively with the resistances 11b and 11a. The starting continues at a somewhat greater speed.

*Position 3.*—The resistances 12b and 11b are also connected in parallel now with the windings 6b'1 and 6a'1. As the ohmic resistance of these windings is lower than the ohmic resistance of the starting resistances even when connected in parallel, the windings 6b'1 and 6a'1 are fed by a current flowing in a direction opposed to that of its flow for positions 1 and 2. These windings produce a subtractive flux with reference to the windings 6a1—6b1 which in their turn are additive with reference to the shunt windings 3A1 and 3A2. The position 3 corresponds to the end of the starting period in a series coupling and may be a permanent position whereas the positions 1 and 2 are only transient positions. It is then possible to modify the speed of the motor preferably in a 1:2 ratio by the operation of the field rheostat 10. If it is desired to make the motor rotate at a higher speed it is necessary to provide for parallel coupling and to this end to move the controller on to its next position after previously returning the rheostat into its short-circuit position.

*Position 4.*—This position is only a transient position and allows passing as disclosed from series coupling to parallel coupling or reversely without breaking the circuit. The starting resistances 11a—11b, 12a and 12b are reinserted for operation as in the case of position 1. The windings 6b'1 and 6a'1 are thus fed again with current producing an additive flux. Furthermore a second feed through the wires 8 and 9 connects the transient resistances 15a and 15b in the circuit so as to obtain at the same time a series coupling feed through the different starting resistances and a parallel coupling feed through the different transient resistances just mentioned. The passage through said position corresponds to the bridge connection already described.

*Position 5.*—The series coupling is eliminated.

*Position 6.*—The two transient resistances 15a and 15b are eliminated through short circuiting thereof.

*The positions 7 and 8* are similar to the positions 2 and 3 in the series coupling by reason of the fact that the position 7 allows connecting resistances 11b and 11a in parallel with the windings 6b'1 and 6a' respectively while in position 8 the resistances 12b and 12a are also connected in parallel with said windings so as to reverse the direction of the current in said windings.

Thus two motors are now available the armature circuits of which include each an additive winding and a subtractive winding. This position 8 may thus be a permanent parallel coupling position for the motors whose speed may be varied, for instance, in a 2:8 ratio by adjustment of field rheostat 10.

It is apparent that by connecting the motors and resistances in this manner it is possible to obtain in a continuous range a speed variation of the motors of 1:8 with the provision that a speed variation of 1:2 is obtained in the series coupling while a variation in speed in a 2:8 ratio is obtained in the parallel coupling.

We may also make use of an arrangement quite similar to those described hereinabove in the case where a double pair of motors instead of a single pair is to be considered as in the preceding case. We would then have to provide simply a supplementary coupling in this case, namely a series parallel coupling.

What we claim is:

1. In a direct current motor drive, the combination with a direct current motor having a field excitation winding adapted to be energized to develop the field flux in a predetermined direction, of a compensating series field winding, a resistance, means for connecting said compensating series field winding so as to be additive with respect to said field flux and in series with said resistance, and means for reconnecting said compensating series field winding so as to be subtractive with respect to said field flux and with said resistance connected in parallel therewith.

2. In a direct current motor drive, the combination with a direct current motor having a field excitation winding adapted to be energized to develop the field flux in a predetermined direction, of a compensating series field winding, a predetermined resistance, an auxiliary resistance, means for initially connecting said compensating series field winding so as to be additive with respect to said field flux and in series with said predetermined resistance and said auxiliary resistance and in series with the armature of said motor to produce a limited additive field and to limit the armature current for starting of said motor, means for short-circuiting said compensating series field winding and said auxiliary resistance in series therewith to reduce the additive field while maintaining said predetermined resistance in circuit to limit the armature current for acceleration of the motor, and means for reconnecting said compensating series field winding so as to be subtractive with respect to said field flux and with said predetermined resistance and said auxiliary resistance in parallel therewith further to reduce the field flux and to provide for an increased armature current to produce a desired speed of said motor.

3. In a direct current motor drive, the combination as defined in claim 2 which comprises a primary additive field winding for said motor, and means for connecting said primary additive field winding in series with said compensating series field winding of said motor.

4. In a direct current motor drive, the combination with a plurality of direct current motors each having a field excitation winding adapted to be energized to develop the field flux of the respective motors in predetermined directions, of a compensating series field winding for each of said motors, a plurality of predetermined resistances respectively associated with said motors, a plurality of auxiliary resistances respectively associated with said motors, means for initially connecting said compensating series field winding of each motor so as to be additive with respect to said field flux thereof and in series with said predetermined resistance and said auxiliary resistance associated with said motor and in series with the armature of at least one other motor, means for short-circuiting said compensating series field winding and said auxiliary resistance in series therewith of each motor to reduce the additive field of said motor while maintaining said predetermined resistance in series with the armature of said other motor, and means for reconnecting said compensating series field winding of each motor so as to be subtractive with respect to said field flux of said motor and with said predetermined resistance and said auxiliary resistance associated therewith in parallel therewith further to reduce said field flux of said motor and to increase the armature current of said motors.

5. In a direct current motor drive, the combination as defined in claim 4 which comprises means for interrupting the series connection of the armatures of said motor and said other motor, and means for reconnecting said armatures in parallel.

6. In a direct current motor drive, the combination with a direct current motor having a field excitation winding adapted to be energized to develop the field flux in a predetermined direction, of a compensating series field winding, a pair of resistances connected in series with and respectively at either side of said compensating winding, means for connecting said compensating series field winding and said resistances in series therewith in series with the armature of said motor and so that said compensating series field winding is additive with respect to said field flux, means for short-circuiting said compensating series field winding and one of said resistances in series therewith to reduce said additive field of said compensating series field winding substantially to zero and to reduce the resistance in series with said armature, and means for short-circuiting said compensating series field winding and the other of said resistances in series therewith to connect said compensating series field winding and said resistances in parallel with each other and as a group in series with said armature of said motor and so that said compensating series field winding is subtractive with respect to said field flux and so as further to reduce the resistance in series with said armature.

7. In a direct current motor drive, the combination with a plurality of direct current motors each having a field excitation winding adapted to be energized to develop the field flux of the respective motors in predetermined directions, of a compensating series field winding for each of said motors, a pair of resistances associated with each motor and connected in series with and respectively at either side of the respective compensating windings of said motors, means associated with each motor for connecting said compensating series field winding and said resistances in series therewith of each motor in series with the armature of at least one other motor and so that said compensating series field winding of said motor is additive with respect to the field flux thereof, means associated with each motor for short-circuiting said compensating series field winding and one of the resistances in series therewith of each motor to reduce the additive field of said compensating series field winding of the said motor substantially to zero and to reduce the resistance in series with the armature of said other motor, means associated with each motor for short-circuiting said compensating series field winding and the other of said resistances in series therewith of each motor to connect said compensating series field winding and said resistances of said motor in parallel with each other and as a group in series with the armature of said other motor so that said compensating series field winding of said motor is subtractive with respect to the field flux thereof and so as further to reduce the resistance in series with the armature of said other motor, and means for selectively connecting the armatures of said motors in series and in parallel.

8. In a direct current motor drive, the combination with a plurality of direct current motors each having a field excitation winding adapted to be energized to develop the field flux of the respective motors in predetermined directions, of a compensating series field winding for each of said motors, a pair of resistances associated with each motor and connected in series with and respectively at either side of the respective compensating windings of said motors, means associated with each motor for connecting said compensating series field winding and said resistances in series therewith of each motor in series with the armature of at least one other motor and so that said compensating series field winding is additive with respect to the field flux of the motor with which it is associated, means associated with each motor for short-circuiting said compensating series field winding and one of the resistances in series therewith of each motor to reduce the additive field of said compensating series field winding of said motor substantially to zero and to reduce the resistance in series with said armature of said other motors, means associated with each motor for short-circuiting said compensating series field winding and the other of said resistances in series therewith of each motor to connect said compensating series field winding and said resistances of said motor in parallel with each other and as a group in series with the armature of said other motors so that said compensating series field winding of said motor is subtractive with respect to the field flux thereof and so as further to reduce the resistances in series with the armatures of said motors, and means for connecting the armatures of said motors in parallel concomitantly with disestablishing said short circuits, said short-cuiting means thereafter being operable to reduce said additive fields and the resistances in series of the said armatures and develop said subtractive fields of the respective motors.

9. In a direct current motor drive, the combination as defined in claim 8 which comprises a primary additive series field winding for each motor, and means for connecting said compensating series field winding and said resistances associated therewith of each motor in series with said primary additive series field winding of said other motor.

10. In a direct current motor drive, the combination with a direct current motor having a field excitation winding adapted to be energized to develop the field flux in a predetermined direction, of a compensating series field winding, a pair of resistances connected in series with and respectively at either side of said compensating winding, a pair of switches, one of said switches being connected in parallel with said compensating winding and one of said resistances in series therewith and the other of said switches being connected in parallel with said compensating winding and the other of said resistances in series therewith respectively to short-circuit said compensating winding and the respective resistances to change the connection of said compensating winding from said series connection thereof with said resistances to parallel connection thereof with both said resistances and to change said compensating winding from additive to subtractive with respect to said field flux, a pair of relays respectively operatively connected to said switches to effect operation thereof upon operation of said relays, and means operable successively to operate said relays to effect operation of said switches to effect said short-circuiting of said compensating winding and said resistances.

11. In a direct current motor drive, the combination with a plurality of direct current motors each having a field excitation winding adapted to be energized to develop the field flux of the respective motors in predetermined directions, of a compensating series field winding for each of said motors, a pair of resistances associated with each motor and connected in series with and respectively at either side of the respective compensating windings of said motors, a pair of switches for each motor, one of said switches being connected in parallel with said compensating winding and one of said resistances in series therewith which respectively are associated with said motors, the other of said switches being connected in parallel with said compensating winding and the other of said resistances in series therewith associated with the respective motors, relays operatively connected to the respective switches to effect operation thereof upon operation of said relays, means operable to energize said relays to effect successive closing operation of both of said switches to short-circuit said compensating winding and the respective resistances connected in series therewith to change the connection of said compensating winding and said resistances from series to parallel connection of said compensating winding and both said resistances and to change said compensating winding from additive to subtractive with respect to said field flux, switch means operable selectively to connect the armatures of said motors in series and in parallel, a relay operatively connected to said switch means and to said switch relays to establish said connection of said compensating windings in series with the resistances associated therewith in the respective motors upon establishing the series connection of the armatures of said motors and thereafter to establish said parallel subtractive connection of said compensating series field windings and said resistances, and a relay operatively connected to said switch means and to said switch relays for reestablishing said series connection of said compensating series field windings and the resistances associated therewith of the respective motors upon connection of said motors in parallel and thereafter to establish said parallel connection of said compensating series field windings and said resistances respectively associated therewith of the respective motors.

12. In a direct current motor drive, the combination with a plurality of direct current motors as defined in claim 4 which comprises means for connecting said armatures in parallel while maintaining said series connection of said armatures, and means for interrupting said series connection of said armatures after connection of said armatures in parallel.

13. In a direct current motor drive, the combination as defined in claim 9 which comprises means for disconnecting said primary additive series field windings when the motors are connected in series.

GEORGES-GABRIEL MOZZANINI.
MAURICE LEBERTRE.

REFERENCES CITED

The following references are of record in the file of this patent:

UNITED STATES PATENTS

| Number | Name | Date |
|---|---|---|
| 1,803,676 | Powell | May 5, 1931 |
| 1,953,792 | Winne et al. | Apr. 3, 1934 |
| 2,217,432 | Cook | Aug. 13, 1938 |
| 2,403,048 | Caldbeck | July 2, 1946 |